(12) United States Patent
Kemp

(10) Patent No.: US 9,660,560 B2
(45) Date of Patent: May 23, 2017

(54) MOTOR DRIVE CIRCUIT AND METHOD OF DRIVING A MOTOR

(71) Applicant: TRW Limited, Solihull West Midlands (GB)

(72) Inventor: Graham Alastair Richard Kemp, West Midlands (GB)

(73) Assignee: TRW LIMITED, Solihull West, Midlands (GB)

( * ) Notice: Subject to any disclaimer, the term of this patent is extended or adjusted under 35 U.S.C. 154(b) by 2 days.

(21) Appl. No.: 14/780,689

(22) PCT Filed: Mar. 26, 2014

(86) PCT No.: PCT/GB2014/050963
§ 371 (c)(1),
(2) Date: Sep. 28, 2015

(87) PCT Pub. No.: WO2014/155112
PCT Pub. Date: Oct. 2, 2014

(65) Prior Publication Data
US 2016/0043671 A1   Feb. 11, 2016

(30) Foreign Application Priority Data

Mar. 28, 2013 (GB) .................................. 1305787.2

(51) Int. Cl.
*H02P 21/00* (2016.01)
*H02P 6/14* (2016.01)
*H02P 29/66* (2016.01)

(52) U.S. Cl.
CPC .............. *H02P 6/145* (2013.01); *H02P 6/142* (2013.01); *H02P 21/0035* (2013.01); *H02P 21/0089* (2013.01); *H02P 29/662* (2016.11)

(58) Field of Classification Search
CPC ........ H02P 6/145; H02P 29/662; H02P 6/142; H02P 21/0035; H02P 21/0089
(Continued)

(56) References Cited

U.S. PATENT DOCUMENTS

| 6,259,226 | B1 * | 7/2001 | Kaitani | H02P 6/085 |
| | | | | 318/798 |
| 6,548,981 | B1 * | 4/2003 | Ishii | H02K 11/04 |
| | | | | 318/15 |

(Continued)

FOREIGN PATENT DOCUMENTS

| JP | 2003291832 A | 10/2003 |
| JP | 2006067727 A | 3/2006 |
| WO | 2012172488 A1 | 12/2012 |

OTHER PUBLICATIONS

Intellectual Property Office, Patents Act 1977: Search Report under Section 17, Application No. GB1305787.2 dated Sep. 25, 2013.

(Continued)

Primary Examiner — Rita Leykin
(74) Attorney, Agent, or Firm — MacMillan, Sobanski & Todd, LLC

(57) ABSTRACT

A drive system for a brushless DC motor having a rotor includes at least one permanent magnet and a stator including at least one phase winding. The system has a drive circuit including a switch associated with the winding for varying the current passing through the winding; a rotor position sensor arranged to sense the position of the rotor; and a controller arranged to provide drive signals to control the switch. The drive system is further arranged to receive a temperature signal that has a value dependent upon the temperature of the at least one magnet of the rotor. The controller is arranged to vary the phase of the current passing (Continued)

through the winding relative to the rotor position dependent upon the temperature of the rotor magnet.

16 Claims, 8 Drawing Sheets

(58) Field of Classification Search
USPC .... 318/400.02, 400.01, 700, 400.12, 400.23, 318/400.24, 400.07
See application file for complete search history.

(56) References Cited

U.S. PATENT DOCUMENTS

| | | | | |
|---|---|---|---|---|
| 6,700,400 B2* | 3/2004 | Atarashi | ............ | B60L 11/1803 318/400.01 |
| 7,084,598 B2* | 8/2006 | Yoshida | ............ | B60H 1/3222 318/400.11 |
| 7,176,644 B2* | 2/2007 | Ueda | ............ | H02P 6/182 318/400.14 |
| 7,242,163 B2* | 7/2007 | Gallegos-Lopez | ..... | H02P 21/06 318/722 |
| 7,323,833 B2* | 1/2008 | Mir | ............ | H02P 21/10 318/100 |
| 7,821,217 B2* | 10/2010 | Abolhassani | ............ | H02P 6/153 173/141 |
| 7,893,637 B2* | 2/2011 | Suhama | ............ | B60L 7/16 318/366 |
| 7,969,106 B2* | 6/2011 | Kitanaka | ............ | B60L 11/1803 318/400.02 |
| 8,232,759 B2* | 7/2012 | Tadano | ............ | H02P 6/18 318/727 |
| 8,312,590 B2* | 11/2012 | Norell | ............ | A47L 9/2831 15/313 |
| 8,387,732 B2* | 3/2013 | Okamura | ............ | B60K 6/547 180/65.275 |
| 8,508,162 B2* | 8/2013 | Choi | ............ | B60L 15/025 318/400.02 |
| 8,519,648 B2* | 8/2013 | Gallegos-Lopez | . | H02P 21/0089 318/400.01 |
| 8,829,830 B2* | 9/2014 | Kobayashi | ............ | H02P 21/06 318/400.01 |
| 8,836,253 B2* | 9/2014 | Kato | ............ | H02P 21/141 318/400.02 |
| 8,866,423 B2* | 10/2014 | Suel, II | ............ | H02P 23/009 318/163 |
| 8,896,244 B2* | 11/2014 | Kleinau | ............ | H02P 3/18 318/139 |
| 8,912,739 B2* | 12/2014 | Kobayashi | ............ | H02P 21/141 318/400.02 |
| 9,024,556 B2* | 5/2015 | Henderson | ............ | H02P 6/10 318/400.01 |
| 9,054,613 B2* | 6/2015 | Hanada | ............ | H02P 27/08 |
| 9,160,272 B2* | 10/2015 | Tachibana | ............ | H02P 6/08 |
| 9,577,560 B2* | 2/2017 | Kobayashi | ............ | H02P 21/141 |
| 2004/0055065 P1* | 3/2004 | Bessho | ............ | A01H 5/02 |
| 2005/0073280 A1* | 4/2005 | Yoshinaga | ............ | H02J 3/01 318/727 |
| 2010/0012408 A1* | 1/2010 | Takasaki | ............ | B60K 6/365 180/65.25 |
| 2011/0083467 A1* | 4/2011 | Asano | ............ | F25B 49/025 62/498 |
| 2013/0020971 A1 | 1/2013 | Gallegos-Lopez et al. | | |

OTHER PUBLICATIONS

PCT International Search Report and the Written Opinion, Application No. PCT/GB2014/050963 filed Mar. 26, 2014, dated Jul. 24, 2014.

* cited by examiner ated in English under PCT Article 21(2) on Oct. 2, 2014 as International Publication Number WO 2014/155112A1. PCT/GB2014/050963 claims priority to U.K. Application No. 1305787.2 filed Mar. 28, 2013. Thus, the subject nonprovisional application also claims priority to U.K. Application No. 1305787.2 filed Mar. 28, 2013. The disclosures of both of these applications are incorporated herein by reference.

MOTOR DRIVE CIRCUIT AND METHOD OF DRIVING A MOTOR

CROSS-REFERENCE TO RELATED APPLICATIONS

This application is the National Phase of International Application PCT/GB2014/050963 filed Mar. 26, 2014, which designated the U.S. That International Application was published in English under PCT Article 21(2) on Oct. 2, 2014 as International Publication Number WO 2014/155112A1. PCT/GB2014/050963 claims priority to U.K. Application No. 1305787.2 filed Mar. 28, 2013. Thus, the subject nonprovisional application also claims priority to U.K. Application No. 1305787.2 filed Mar. 28, 2013. The disclosures of both of these applications are incorporated herein by reference.

BACKGROUND OF THE INVENTION

This invention relates to motor control circuits and to methods of controlling a multi phase electric motor.

Electric motors are becoming increasingly common in a diverse range of applications. It is known, for example, to provide an electric power steering (EPS) system of the kind comprising an input shaft, an output shaft, a torque sensor adapted to measure the torque in the input shaft, and an electric motor adapted to apply an assistance torque to the output shaft dependent upon the torque measured by the torque sensor.

A typical permanent magnet electric motor comprises a rotor that is magnetic, for example including a permanent magnet, and a stator including a plurality of phase windings on a yoke. Applying suitable voltages across each of the phase windings causes current to flow through the windings, generating a current flux vector in the air gap between the stator and the rotor. This flux interacts with the magnetic field of the rotor magnets to cause the rotor to rotate to a point of equilibrium in which the current vector is aligned with the axis of the rotor magnetic field.

To cause the rotor to turn continuously, the current passed through the windings must be varied in a sequence. This causes the current vector to rotate. This can be achieved by modulating the voltages across each winding under the control of a motor drive circuit.

The torque developed in the motor is dependent firstly on the current passing through the windings, in a generally linear manner, and secondly on the phase of the current relative to the flux due to the rotor magnets.

When the rotor is stationary, the greatest torque is developed when the current vector is in quadrature with the rotor flux vector; no torque will be developed when the current is in phase with the rotor flux. For this reason, motors are generally controlled so as to keep the current in quadrature with the rotor flux. However, as rotor speed increases the back emf that is produced in the coils also increases. This limits the torque that can be produced. It is known to advance the phase of the current with respect to the rotor flux, which can increase the torque available under certain circumstances.

Furthermore, the maximum rotational speed of such a motor is dependent upon the voltage at the motor phase terminals—this voltage must be greater than the back EMF generated by the motor in order to generate a torque. The back EMF increases generally linearly as a function of speed of the motor. For a battery-powered motor such as would be used in an EPS system, the maximum motor speed is therefore indirectly governed by the battery voltage. This can also be countered by advancing the phase of the current relative to the motor, which produces a current component that is aligned with the magnetic field and can act to reduce, or weaken, the field, in turn reducing the back emf at a given rotor speed. With the field reduced, the motor speed can be increased.

SUMMARY OF THE INVENTION

According to the invention, there is provided a drive system for a brushless DC motor having a rotor including at least one permanent magnet and a stator including at least one phase winding, the system comprising a drive circuit including switch means associated with the winding for varying the current passing through the winding; rotor position sensing means arranged to sense the position of the rotor; and control means arranged to provide drive signals to control the switch means; the drive system further being arranged to receive a temperature signal that has a value dependent upon the temperature of the at least one magnet of the rotor, characterised in that the control means is arranged to vary the phase of the current passing through the winding relative to the rotor position dependent upon the temperature of the rotor magnet.

The control means may be adapted to control the motor in a normal control mode whereby the control means is arranged to advance the phase of the current passing through the winding as a function of the motor rotor speed. When operating in this mode the amount of phase advance chosen may be independent of the temperature or substantially independent of temperature.

The control means may be arranged to operate the motor in an abnormal mode when the temperature is above a predetermined level, in which in the abnormal mode the amount of phase advance is less than that which would be applied if the motor was operating in the normal mode under certain operating conditions. Specifically, the control means may be arranged to operate the motor in an abnormal mode when the temperature is above a predetermined level, in which in the abnormal mode the control means is arranged to advance the phase of the current passing through the winding as a function of the motor rotor speed and the temperature such that under a range of predefined operating conditions the control means is arranged to apply a reduced amount of phase advance.

By reduced amount of phase advance we mean that for a given speed and current demand the amount of phase advance that is applied will be less than that which would be applied outside of the certain operating conditions, and less than would be applied for a given speed and current demand when operating in the normal mode.

These operating conditions may be ones in which the magnet would otherwise become permanently demagnetised if the phase advance is not reduced or kept below a predetermined level. If the conditions are not met, the phase may be varied in the same way when in both the normal and abnormal modes, the drive system considering modification of the amount of phase advance not to be required in those conditions. Typically the range of operating conditions will correspond to a range of elevated temperatures.

To determine if the condition is met, the drive system may optionally monitor the demand current as well as the temperature, as well as the phase advance angle. Large phase advance angles at low demand currents may fall outside of the conditions that could cause damage to the magnets (insufficient d-axis current) when smaller phase advance angles at higher demand currents may fall within.

Thus, the drive system may operate in two identifiable modes. The drive system may actively select which one is to be used as a function of temperature, the phase being varied as a function of temperature only when in the abnormal mode, and not varied with temperature when not in that mode. It may move from one mode to another as a temperature threshold is crossed. The threshold for entering the abnormal mode may be greater than the threshold for returning to the normal mode, or they may be the same.

The system need not, of course, in all embodiments actively select which mode to be in, and the system may be considered by default to be in the normal mode or abnormal mode according to how the phase is being varied. For instance, the only way to tell which mode it is in may be by observing the behaviour of the drive system and the operating conditions.

The control means, in the normal mode and the abnormal mode, may be adapted to advance the phase of the current passing through the windings relative to the rotor position when the motor speed reaches or is in excess of the maximum speed that can be achieved without phase advance, the so called motor rated speed. The control means may vary the phase as required to permit additional torque to be generated for a given motor speed.

Motors in many applications, such a electric power steering applications, often use rare earth magnets such as NdFeB magnets (for example NEOQUENCH-DR: http://www-.daido-electronics.co.jp/english/product/neoquench_dr/index.html). The applicant has appreciated that these magnets have temperature dependant properties, including their ability to retain magnetic field once magnetized. As temperature is increased the field required to damage the magnet's magnetization is reduced. When the phase of the currents is advanced, this introduces potentially harmful d-axis current (which creates magnetic field which opposes the magnet). If the temperatures are high when a high current is applied to the motor and also a large phase advance is present at the same time, permanent reduction in the magnetisation of the magnets can occur.

To prevent damage, it is known to apply higher amounts or rare earth metals to the magnets so as to raise the temperature at which damage occurs beyond the maximum expected temperature and phase advance conditions. However, this increases the cost of the magnets.

By monitoring the temperature of the magnet the drive system of the invention can operate in an abnormal mode in which the amount of d-axis current is reduced or limited to levels which will not harm the magnets, and therefore the magnets can survive higher temperatures without damage to the magnetization (and therefore without permanent damage to motor performance). It may only modify the advance when it determines that damage will occur (dependent on the temperature and current and amount of advance). Thus, the protection of the abnormal mode only comes into effect at the high temperatures, motor speeds and phase advance, so that in less demanding conditions the performance of the system is not compromised. This allows a higher maximum operating temperature to be achieved for a given magnet composition.

The normal mode may therefore be applied whenever the temperature is below the predetermined level, when it is known that the magnets will not be damaged by the d-axis currents, and the abnormal mode used at higher temperatures. This predetermined temperature will depend on the motor design and in particular on the magnet properties, and may be preset during production of the drive system.

For example, with NdFeB magnets the temperature at which damage occurs depends on the composition of the magnets, and the abnormal mode may be used when the temperature exceeds 100 degrees centigrade, or 120 degrees, or 140 degrees, for example. The temperature threshold at which the abnormal mode operates may correspond to the temperature at which damage may occur, or may be below that by a safety margin. It may be chosen to be in the range of substantially 100 degrees to substantially 150 degrees, or substantially 100 degrees to substantially 130 degrees, or between 120 and 130 degrees or any other combination of these upper and lower range limits.

The drive system may receive the temperature signal from one or more temperature sensors associated with the motor or the drive system. These may measure the temperature of the magnets directly or indirectly, for example measuring a component that is not the rotor magnet but from which the temperature of the rotor magnet can be estimated.

The control means may generate drive voltage signals in response to a motor current demand signal, the magnitude of the motor current demand signal being a function of the torque that the motor is to produce. The control means may include a d-q frame convertor that converts the current demand signal into a q-axis current component and a d-axis current component in the d-q frame of reference.

The control means may include a phase advance calculator that determines the amount of phase advance that is to be applied and which modifies the operation of the converter. The phase advance calculator may be responsive to the rotor speed, the supply voltage (that is available to be applied to the winding) and the motor rotor magnet temperature signal. It may output a phase advance angle signal that is input to the d-q converter and which the converter uses in converting the current demand signal to the d-q frame.

In the abnormal mode, the control means may be arranged to multiply the phase advance with a scaling factor so that a reduced advance is applied. For example, the phase advance calculator may calculate a reduced phase advance relative to the normal mode by calculating a phase advance angle in the same way as during normal mode and then applying a scaling factor to the phase advance angle, the scaled phase advance angle being fed to the d-q converter.

Alternatively, in the abnormal mode the control means may be arranged to apply an absolute limit to the phase advance that can be applied by the drive circuit so that the phase advance is kept below the predetermined absolute limit. The limit may comprise a maximum phase advance angle. For example, the phase advance calculator may, in the abnormal mode, calculate an initial phase advance angle and then apply a limit to that phase advance, the limited phase advance angle being fed to the d-q converter.

In another arrangement, in the abnormal mode the phase advance calculator and d-q-converter may apply the same phase advance that would be applied in the normal mode control means and may calculate q-axis current components and a d-axis current components based on the normal phase advance, and the control means may the modify the value of the d-axis current component, the q axis component and the modified d-axis current component being used to define the desired phase current and phase advance angle.

In this arrangement, the phase advance calculator and d-q converter run as normal, with the limiting of phase advance being achieved by simply modifying the d-axis current component output from the converter.

The control means may be arranged to modify the d-axis component independent of the q-axis component.

The d-axis component may be modified by passing the component through a limiter that limits the magnitude of the d-axis component. It may limit it to a predetermined level. T The control means may be arranged to vary the limit as a function of the motor speed, or in some other manner. In practice, the d-axis component may pass through the limiter in both the normal and abnormal modes, the limit in the normal mode being higher than in the abnormal mode so that no limiting, or reduced limiting, is applied in the normal mode. i.e. d axis current=MAX (d axis current, maximum D axis current). The maximum D axis current could be scheduled with speed.

In an alternative, the d-axis current component may be passed through a scaling function that multiplies the control means by a scaling factor in the abnormal mode. The scaling factor, or gain factor, k, may be predetermined and of fixed value or may be a variable gain as a function of motor speed, i.e. advance=k*advance where k varies between 0 and 1 or is fixed in value between 0 and 1.

The amount of phase advance that is applied when in the abnormal mode may by chosen such that the amount of demagnetisation of the magnet does not exceed 1 percent, or 2 percent or does not exceed 3 percent or up to 5 percent when the temperature of the motor magnet is below a maximum agreed operating temperature.

The maximum agreed operating temperature will generally exceed the threshold at which abnormal mode operation is used, and will generally only be achievable because of the intervention of the abnormal mode which ensures that the damaging effect of excess phase advance is avoided if at the high temperatures.

The motor may comprise a buried magnet motor, or any other type of permanent magnet motor.

According to a second aspect the invention provides a method of driving a brushless DC motor of the kind comprising a rotor including at least one permanent magnet and a stator including at least one phase winding, the method comprising:
determining the position of the rotor of the motor and applying a drive voltage to the phase that causes a current to flow in the phase,
characterised by varying the phase of the current passing through the winding relative to the rotor position dependent upon the temperature of the rotor magnet.

The method may comprise operating the motor in a normal control mode when the temperature of the magnet is below a first threshold level whereby the control means is arranged to advance the phase of the current passing through the winding relative to the rotor position when the motor speed reaches or is in excessive of the maximum speed that can be achieved without phase advance.

The method may also comprise operating the motor in an abnormal mode when the temperature is above a second threshold level, in which in the abnormal mode the method comprises applying an amount of phase advance that is less than that which is applied when the control means is operating in the normal mode.

The first and threshold level and second threshold level may be same level, so that the motor operates in the normal or abnormal mode when below of above that level. Alternatively, the first threshold level may be lower than the second level allowing some hysteresis to be incorporated into the transition from normal to abnormal modes.

The method may comprise applying phase advance as a function of the speed of the motor rotor, the amount of advance being reduced if the motor is operating in the abnormal mode indicating that the magnets are hot and may be at risk of permanent demagnetisation.

BRIEF DESCRIPTION OF THE DRAWINGS

There will now be described, by way of example only, several embodiments of the present invention with reference to and as illustrated in the accompanying drawings of which:

FIG. 1b is a block diagram showing a suitable implementation for the current controller of FIG. 1a;

DETAILED DESCRIPTION OF THE PREFERRED EMBODIMENTS

Figure 1A:
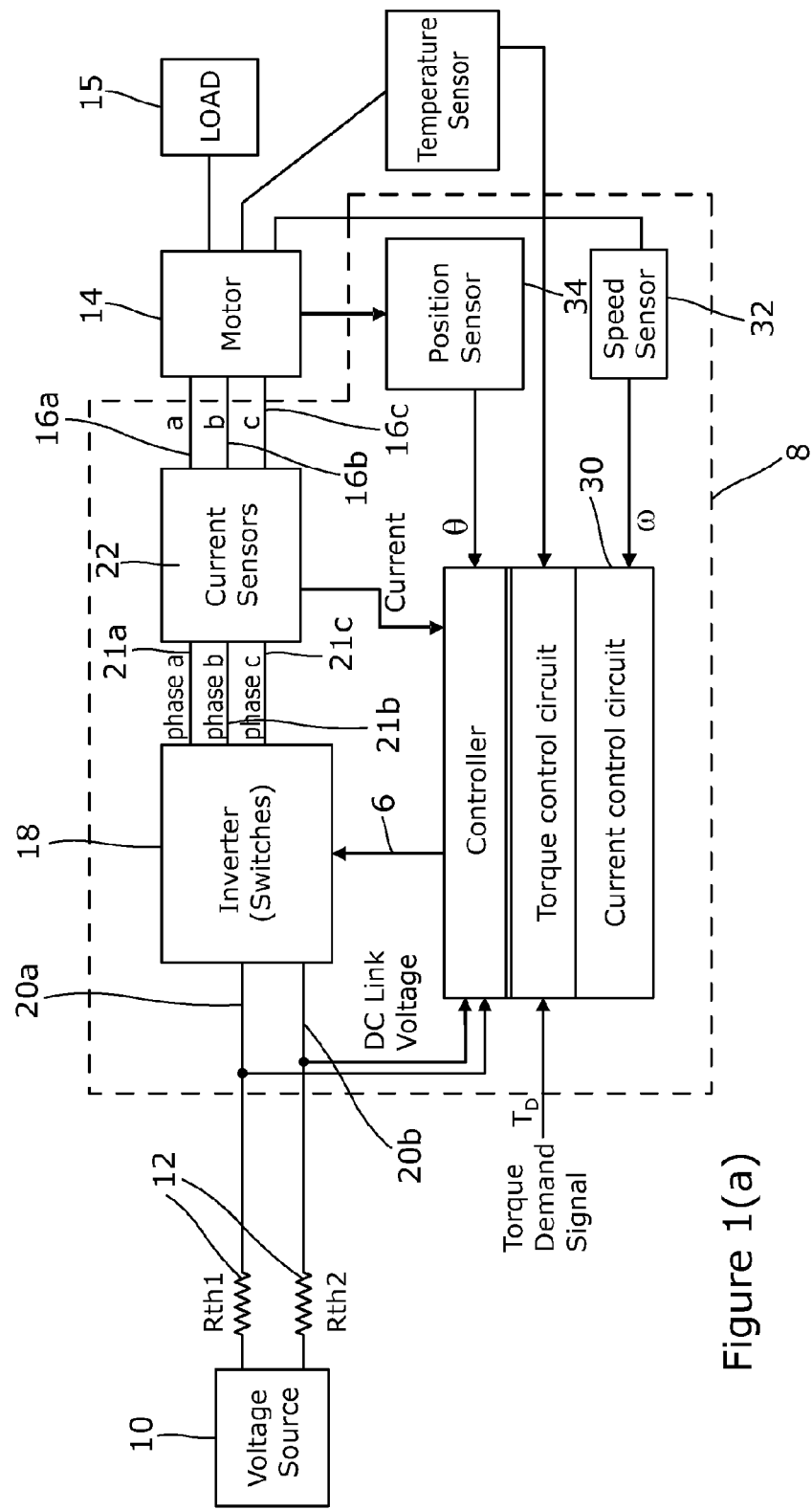
FIG. 1a is an overview of a embodiment of a drive system for a brushless permanent magnet motor in accordance with the present invention.

Referring to FIG. 1 a drive system according to an embodiment of the present invention comprises a drive circuit 8, which is arranged to take power from a DC power supply 10, in this case a vehicle battery, via a wiring harness 12 represented as resistors Rh1 and Rh2. The drive circuit 8 uses this power to drive a three-phase AC permanent magnet motor 14 which is connected to a mechanical load 15, in this case the output shaft of an EPS system. The motor 14 is conventional and comprises three motor windings generally designated as phases a, b and c, connected in a star network, although there could be more than three phases and the three or more phases may be connected in an alternative topology such as a delta configuration. One end of each winding is connected to a respective terminal 16a, 16b, 16c. The other ends of the windings are connected together to form a star centre.

The drive circuit 8 includes a switch means in the form of an inverter 18. The inverter 18 comprises three pairs of switches, typically transistors. Each of the pairs of switches comprises a top transistor and a bottom transistor connected in series between a positive line 20a and negative line 20b from the voltage source 10. Three outputs 21a, 21b, 21c are each tapped off from between a respective pair of transistors. The outputs 21a, 21b, 21c are each connected to the respective motor terminal 16a, 16b, 16c via current sensors 22.

A control means, embodied as a programmable controller 30, is arranged to control the switches in the inverter 18 so as to provide pulse width modulation of the current to the motor windings a, b, c. The controller 30 therefore has six switch control outputs producing six switch control signals 6 to the control gates of the six switches.

The controller 30 receives input signals from the dc-link sensors 28 indicating the instantaneous dc-link voltage ECU-dc$_{link}$ and current, from the current sensors 22 from which it can determine the three motor phase currents, from a speed sensor 32 on the motor output from which it can determine the motor speed, from a motor position sensor 34 from which it can determine the rotational position of the rotor of the motor 14 and (as will be explained later) a temperature signal from a temperature sensor. The controller also receives a torque demand input TD and is arranged to control the inverter 18 to drive the motor to produce the demanded torque TD.

The switches in the inverter 18 are turned on and off in a controlled manner by the control circuit 30 to provide pulse width modulation of the potential applied to each of the terminals 16a, 16b, 16c, thereby to control the potential difference applied across each of the windings a, b, c and hence also the current flowing through the windings. This current is sensed by the current sensors 22. Control of the phase currents in turn controls the strength and orientation of the total current vector produced by the windings, and hence also the phase of the rotating current vector, relative to the phase of the magnetic field of the rotor as that rotates.

FIG. 1a illustrates a suitable from of current control circuit 30 that may be used. It includes a current demand to d-q axis current converter 31, which includes a phase advance circuit 33 as will be explained later. The d-q frame is fixed relative to the rotor, and so to perform this conversion the position of the motor is used as a parameter along with the demanded current. This conversion process is well known to the person skilled in the art.

The d-q axis current generated by the converter 31 is fed to a subtractor block 35 which is also fed with a measurement of the actual motor currents, iDQ, also in the d-q axis frame. The difference signal, or error signal, produced by the subtractor is fed into a PI controller 37, whose function is to drive the error signal towards zero in value, at which time it is assumed that the actual currents in the motor match the demanded currents. The output of the PI controller 37 is converted from the dq frame into actual phase voltages, which are then fed into the drive circuit that comprises a PWM controller 18 that generates PWM voltage waveforms for each phase that form the six current signals 6.

In a practical system it is usual to have the current sensors 22 to measure the current in each of the phases, or a single current sensor 28 in the dc link which can be used to measure the current in each of the phases by sampling the current at controlled times in the PWM period of the controller 30.

Figure 2:
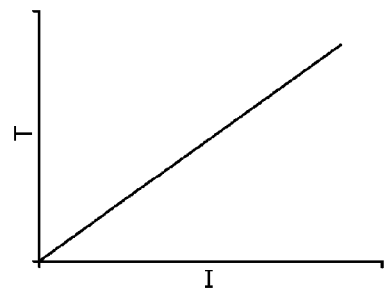
FIG. 2 is graph showing motor Torque against drive current I when the motor drive current is in phase with the rotation of the motor.
Figure 4A:
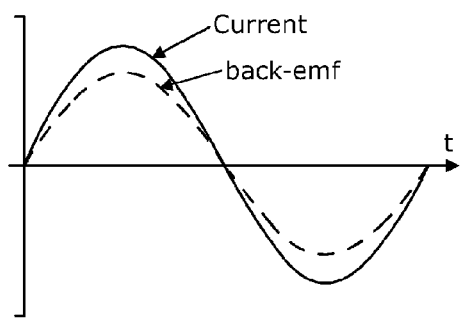
FIG. 4a shows the variation in motor current and motor back emf over time in the motor when no phase advance is applied.

Referring to FIG. 2 and FIG. 4a, in the simple case where the phase of the current waveform is in phase with variation in time t of the rotor position and hence also in phase with the back emf produced in the motor, the torque T is directly proportional to the phase current I, and given by the equation:

$$T = K_T I$$

where $K_T$ is the motor torque constant. This equation would be modified slightly for a salient machine, such as a buried magnet type motor, with the torque T then also being dependent in that case on an additional term that is dependent on the d-axis current.

Figure 3:
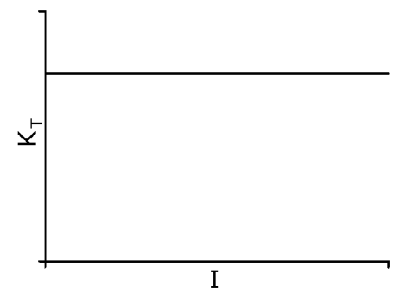
FIG. 3 is a plot of motor torque constant against motor drive current.

Under normal circumstances, $K_T$ is constant over all currents as shown in FIG. 3. This mode of operation is said to have zero phase advance, as the current waveform is in phase with the back emf. In the d-q frame, all the current will lie along the q-axis, 90 degrees offset from the rotor position but in phase with the back emf. There will no current along the d-axis.

Figure 4B:
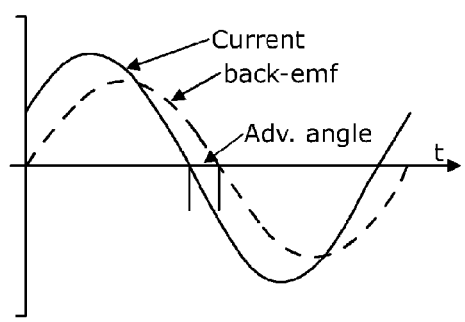
FIG. 4b is a plot of motor current and motor back emf over time in the motor when a phase advance angle has been applied.

However, as is well known, if the current phase is advanced, as shown in FIG. 4b, so that it is no longer in phase with the back emf, but ahead of it by a phase advance angle $\theta_{adv}$ then the motor output torque varies as:

$$T = K_T I \cos \theta_{adv}$$

Figure 5:
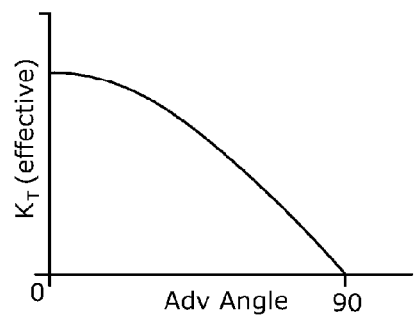
FIG. 5 is a plot of phase advance against motor torque constant showing the effect of increasing phase advance on the motor torque constant.

This produces an effective torque constant $K_{T\text{-}effective}$ that varies with the cosine of $\theta_{adv}$ as shown in FIG. 5. As well as q-axis current there will now be a d-axis current component.

Figure 6:
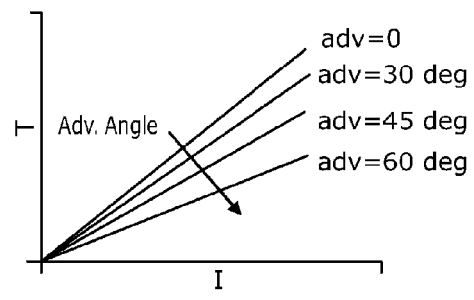
FIG. 6 is a set of traces of phase advance motor current against motor torque for different phase advance angles of 0 degrees, 30 degrees, 45 degrees and 60 degrees.

For any phase advance angle $\theta_{adv}$ the motor torque T is still proportional to the phase current I, but as $\theta_{adv}$ increases, the effective torque constant decreases, and so the torque for any given current decreases as shown in FIG. 6. Increasing the phase advance angle can also enable the motor to operate at higher speeds and output power as will now be described in more detail.

According to motor equivalent circuit theory, the applied phase voltage $V_{ph}$ is given by $$V_{ph} = E + I R_{ph} + j I X$$

where E is the back emf, I is the phase current, and X is the synchronous impedance.

Figure 7A:
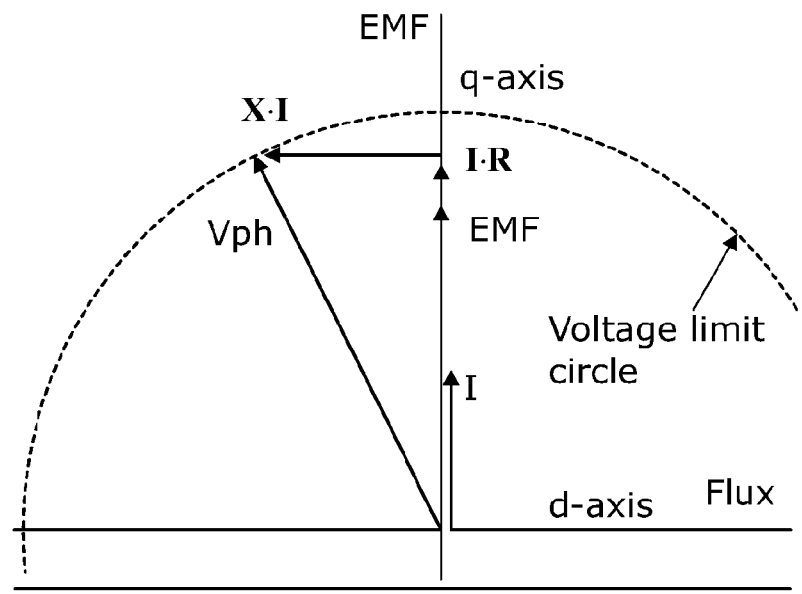
FIG. 7a is a plot of motor flux, q-axis and d-axis current demand components in the d-q frame of reference when no phase advance is applied, showing also the back emf voltage

These vector quantities can be represented in a motor phase diagram as shown in FIG. 7a. In this diagram the d-axis is aligned with the magnetic flux of the rotor and the q-axis is perpendicular to the d-axis. With zero phase advance, the back emf is in phase with the phase current I, and the voltage XI is 90° out of phase. The voltages $V_{ph}$, IR, E and XI can therefore be represented as shown. However the back emf increases with motor speed, and $V_{ph}$ is limited by the ECU-dc$_{link}$ voltage, typically to about two thirds of the dc link voltage. Therefore the phase voltage $V_{ph}$ cannot extend beyond the voltage limit circle, and there is a maximum motor speed, determined by the maximum back emf, above which the motor cannot be driven.

Figure 7B:
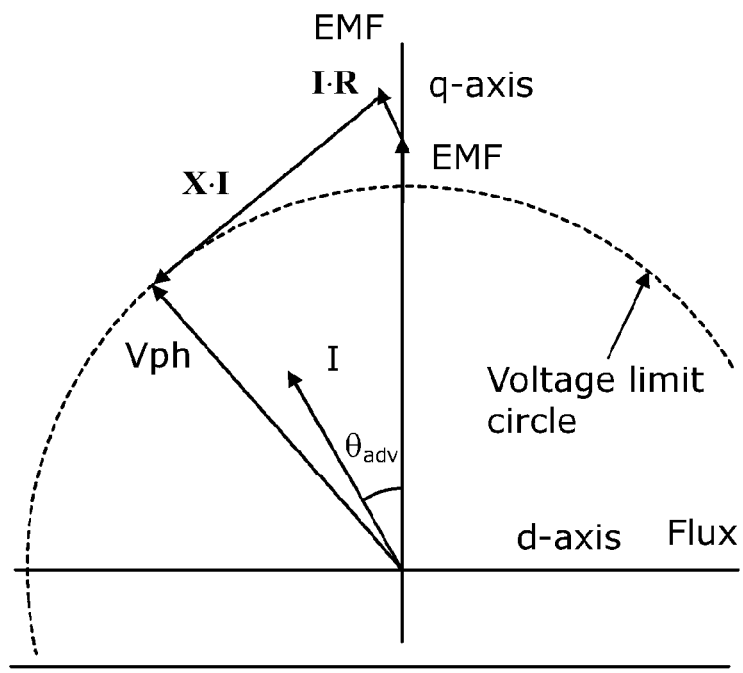
FIG. 7b is a corresponding plot to FIG. 7a but for the case where a phase advance angle is applied that is greater than zero

However, referring to FIG. 7b, if a phase advance of angle $\theta_{adv}$ is introduced, then the current is not in phase with the back emf. This varies the phase of the IR and XI voltage vectors with respect to the back emf as shown. The result of this is that the magnitude of the back emf can be increased, and the vector sum of the voltages E, IR, XI still equal the $V_{ph}$ limit as shown. This means that the maximum possible output speed and power of the motor can be increased for any given ECU-dc$_{link}$ voltage.

Figure 8:
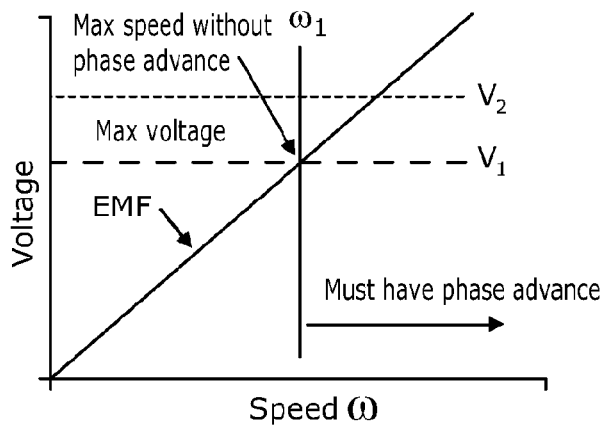
FIG. 8 is a plot of voltage against speed showing the maximum motor speed that can be attained without the use of phase advance for a given DC link voltage v1 or higher voltage v2.

Referring to FIG. 8, the result of this is that for a fixed maximum ECU-dc$_{link}$ voltage $V_1$ there is a maximum motor speed $\omega_1$ which cannot be exceeded without phase advance. This is where the back emf, which increases with motor speed, equals the maximum possible ECU-dc$_{link}$ voltage $V_1$. For higher motor speeds, phase advance must be used.

Figure 9:
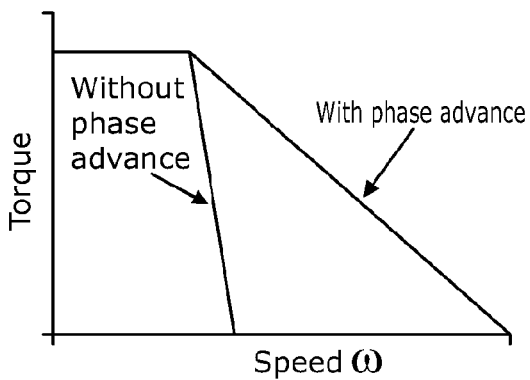
FIG. 9 is a plot of Torque against speed showing how phase advance allows increased motor speed to be attained traded against motor torque.
Figure 10:
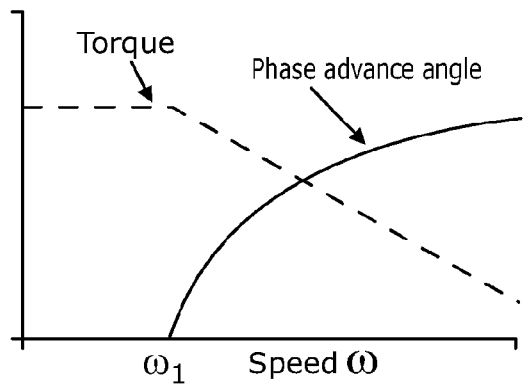
FIG. 10 is a plot showing the relationship between phase advance angle and torque for a range of motor speeds up to and above the maximum rated motor speed.
Figure 12:
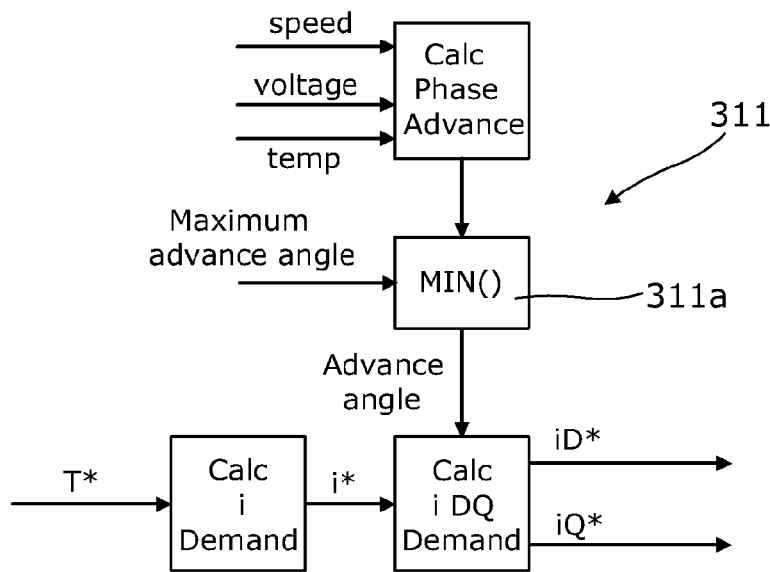
FIG. 12 is a block diagram equivalent to FIG. 11 for a first modified drive circuit in an abnormal mode in which phase advance is limited.

A typical motor torque/speed curve can be plotted as shown in FIG. 9. As can be seen, with phase advance the operating area is greatly increased. Higher motor speeds can be obtained, and also higher torques for some motor speeds can also be achieved. A typical phase advance profile is shown in FIG. 10. The phase advance is maintained at zero up to a speed $\omega_1$, which is slightly lower than $\omega_1$ in FIG. 9, and then increased with increasing motor speed.

This results in a maximum torque that is constant up to speed $\omega_1$ and then decreases at a constant rate with increasing motor speed.

Figure 1B:
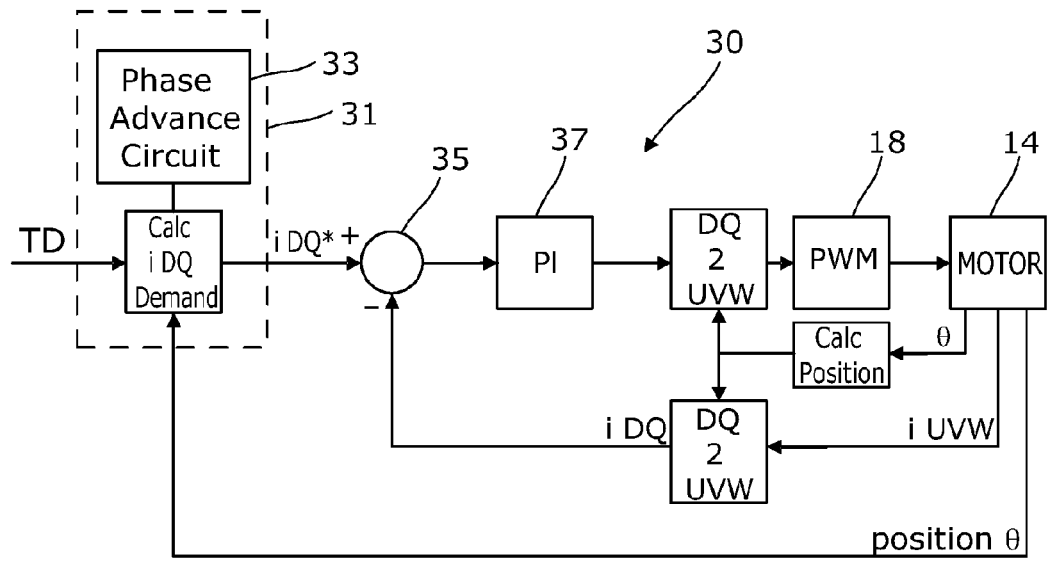
Figure 11:
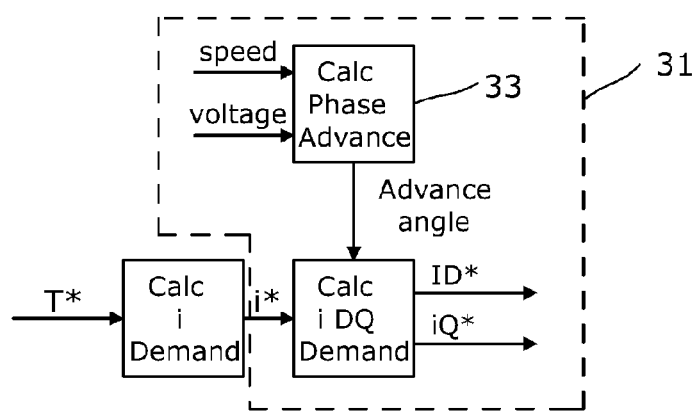
FIG. 11 is a block diagram showing the various parts of the drive circuit used to convert the torque demand signal into a current demand signal in the d-q frame, when running in a normal mode.

To exploit this effect, the controller includes a phase advance circuit which forms a part of the current controller 30 as shown in FIG. 1b and FIG. 11. The phase advance circuit is a calculator block that generates a phase advance angle value that is fed into the d-q converter. Typically, the converter subtracts (or adds) the phase advance angle from (or to) the motor rotor position signal it receives, and uses the new position signal as the basis for the conversion.

As shown in FIG. 11, the phase advance calculator receives as inputs a motor rotor speed signal indicative of the speed of the rotor, and a motor drive voltage signal indicative of the drive voltage, ECU DC link.

The applicant has appreciated that that many magnets have temperature dependant properties, including their ability to retain magnetic field once magnetized. As temperature is increased the field required to damage the magnet's magnetization is reduced. When the phase of the currents is advanced, this introduces potentially harmful d-axis current (which creates magnetic field which opposes the magnet).

To prevent the phase advance currents from damaging the magnets, a modified control circuit 30 is provided that receives a signal indicative of the temperature of the motor rotor magnets. This can be provided by a temperature sensor that measures the temperature of the rotor magnets. Alternatively, an estimator may be provided that estimates the temperature from an indirect measurement of the rotor magnets. Dependent on the temperature the circuit 30 will operate in the normal manner described above, with phase advance being applied as a function or DC link voltage and motor speed, or in an abnormal mode in which the amount of phase advance is reduced in some way.

The temperature value is with a threshold temperature value. If the temperature signals exceeds a predefined temperature value, such as 130 degrees centigrade, then the current controller moves from a normal mode as described above into the abnormal mode as will now be described.

In the abnormal mode, the amount of phase advance that is applied, or can be applied, is reduced or limited to levels which will not harm the magnets, and therefore the magnets can survive higher temperatures without damage to the magnetization (and therefore without permanent damage to motor performance). In effect, the amount of d-axis current is limited or reduced to prevent permanent damage occurring.

The reduction of the amount of phase advance can be applied in several different ways. The applicant envisages several options as shown in FIGS. 12 to 15 of the drawings. In each case, the only modification to the drive circuit shown in FIGS. 1a, 1b and 11 is to the d-q converter that converts the current demand signal into the q axis and d axis components that are fed to the subtractor block 35.

Abnormal Mode 1—Limit Phase Advance

In this mode, the converter 310 include a phase advance calculator that calculates the Phase advance as normal, but the advance angle is limited to a maximum phase advance angle, i.e. advance=MIN(advance, maximum advance angle) by a limiting block 310a which acts on the phase angle value before it is applied to the d-q converter. This limit is only applied when operating in the abnormal mode, and is not applied when in the normal mode. The modified (limited) phase angle is then fed to the converter.

Figure 16A:
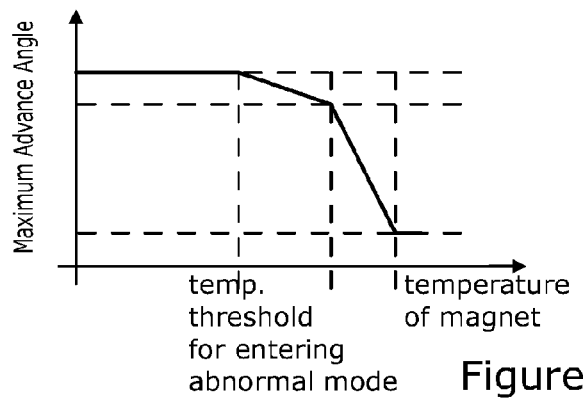
FIG. 16(a) is a plot of maximum phase angle against temperature that can be used in the abnormal mode; and 16(b) is a plot showing the effect on D axis current.
Figure 16B:
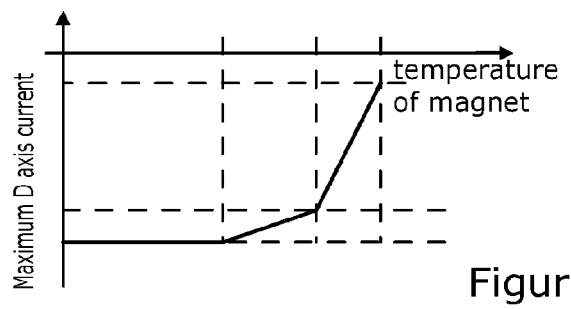

The Maximum phase advance angle that is permitted in the abnormal mode may be varied as a function of temperature as shown in FIG. 16a, being reduced linearly between the threshold at which the abnormal mode is entered up to a higher threshold, and then reduced linearly at a higher rate one above the higher threshold. The effect of this scaling on the maximum allowable d-axis current is shown in FIG. 16b. Provided the phase advance angle is below the limit, the same phase advance angle will be used in the normal and abnormal modes.

Abnormal Mode 2—Scale Back Phase Advance Angle

Figure 13:
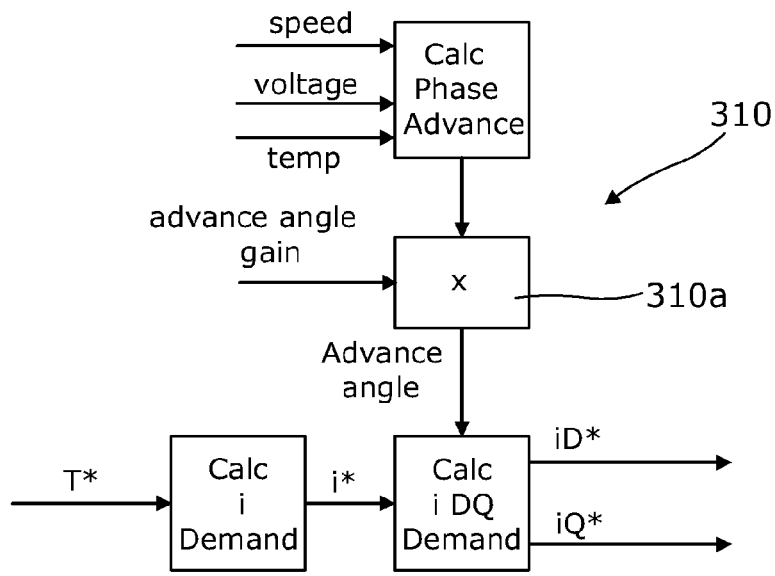
FIG. 13 is a block diagram equivalent to FIG. 11 for a second modified drive circuit in an abnormal mode in which phase advance is limited.

In this arrangement, as shown in FIG. 13, the Phase advance angle is calculated by the current converter block 311 as normal but the advance angle is scaled by a gain factor, i.e. advance=k*advance where k varies between 0 and 1. This scaling is only done when in the abnormal mode, and is not applied in the normal mode. Scaling is applied by a scaling block 311a that modifies the phase angle produced by the phase angle calculator, the scaled angle being fed to the d-q converter block.

Figure 17:
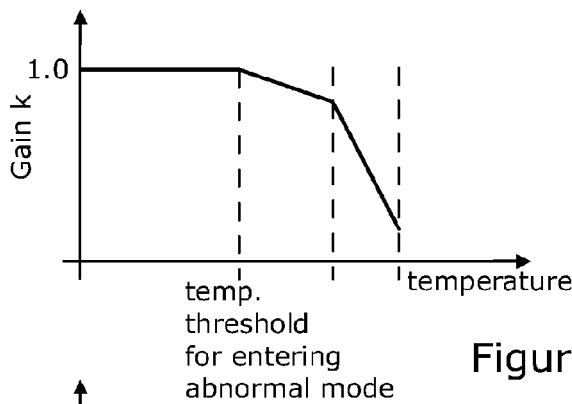
FIG. 17 is a plot showing the variation in gain applied to the phase advance in the abnormal mode as a function of temperature.
Figure 18:
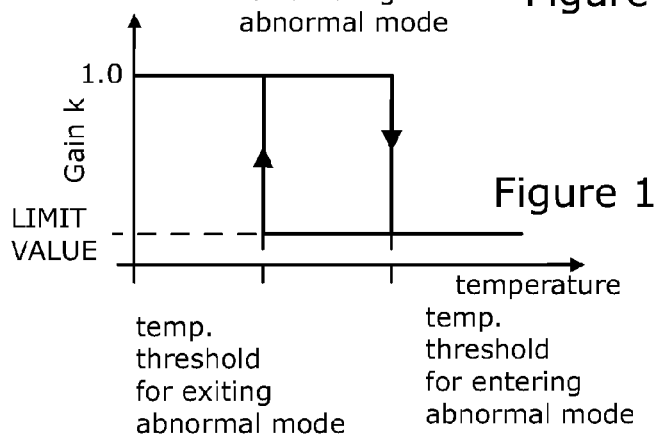
FIG. 18 is a plot showing an alternative variation in gain applied to the phase advance in the abnormal mode as a function of temperature, the entry and exit thresholds for the abnormal mode being chosen to be correspond to different temperatures.

The scaling or Gain could be scheduled with speed or be a switch with hysteresis as shown in FIGS. 17 and 18 of the drawings respectively. When hysteresis is used, the threshold temperature for entry into the abnormal mode is chosen to be higher than a threshold temperature used to determine when to exit the abnormal mode and return to the normal mode.

Abnormal Mode 3—Limit D Axis Current

Figure 14:
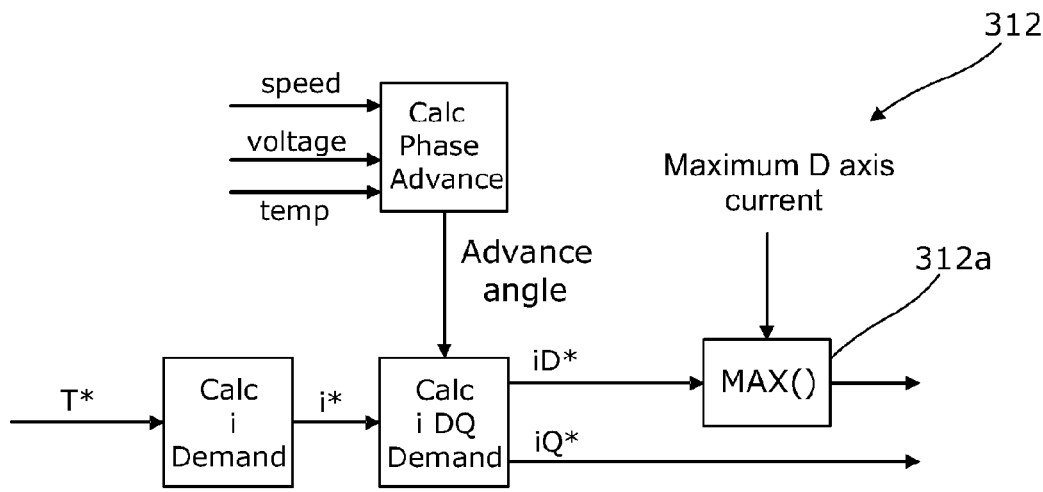
FIG. 14 is a block diagram equivalent to FIG. 11 for a third modified drive circuit in an abnormal mode in which phase advance is limited.

In this arrangement, shown in FIG. 14, the current converter 312 calculates current demands as normal, not dependent on the temperature. However, the D axis current component is then limited to a maximum magnitude, i.e. d axis current=MAX (d axis current, maximum D axis current) by passing it through a limiter 312a before feeding it with the q-axis component to the subtractor block 35. This limiting is only applied in the abnormal mode, and is not applied in the normal mode.

Maximum D axis current could be scheduled with speed or be a switch with hysteresis as with advance angle approach as with Options 1 and 2.

Abnormal Mode 4—Scale Back D Axis Current

Figure 15:
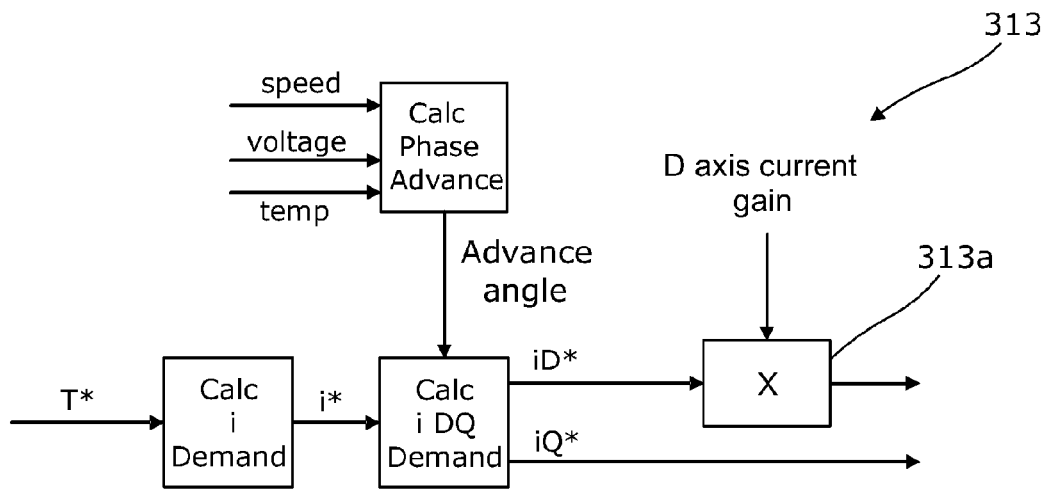
FIG. 15 is a block diagram equivalent to FIG. 11 for a fourth modified drive circuit in an abnormal mode in which phase advance is limited.

In this alternative scheme, shown in FIG. 15, the current demands are calculated as normal by the current converter 313 but the D axis current is scaled by a gain factor, i.e. d axis current=k*d axis current where k varies between 0 and 1. This is only done in the abnormal mode by passing the d-axis component through a scaling block 313a.

Again, the maximum D axis current could be scheduled with speed or be a switch with hysteresis as shown in FIGS. 17 and 18.

Of course, it is possible that any combination of these four modes could be used in a drive system to produce a reduction in phase advance in the abnormal mode.

The invention claimed is:

1. A drive system for a brushless DC motor having a rotor including at least one permanent magnet and a stator including at least one phase winding, the drive system comprising:
a drive circuit including switch means associated with the winding for varying current passing through the winding;
rotor position sensing means arranged to sense the position of the rotor; and
control means arranged to provide drive signals to control the switch means;
the drive circuit further being arranged to receive a temperature signal that has a value dependent upon the temperature of the at least one magnet of the rotor,
characterized in that the control means is arranged to vary the phase of the current passing through the winding relative to the rotor position dependent upon the temperature of the rotor magnet by controlling the motor in a normal mode when the temperature of the rotor magnet is below a predetermined temperature and in an abnormal mode when the temperature of the rotor magnet is above the predetermined temperature.

2. A drive system according to claim 1 in which in the normal mode, the control means is arranged to advance the phase of the current passing through the winding as a function of the motor rotor speed.

3. A drive system according to claim 2 in which in the abnormal mode, the control means is arranged to advance the phase of the current passing through the winding as a function of the motor rotor speed and the temperature of the rotor magnet such that, under a defined range of operating conditions the control means is arranged to apply a reduced amount of phase advance.

4. A drive system according to claim 3 in which the defined range of operating conditions in which the phase advance is reduced corresponds to conditions in which the magnet would become permanently demagnetized if the phase advance is not reduced.

5. A drive system according to claim 2 in which the control means is adapted to advance the phase of the current passing through the windings relative to the rotor position when the motor speed reaches, or is in excess of, a maximum speed that can be achieved without phase advance.

6. A drive system according to claim 1 in which the control means operates in the abnormal mode when the temperature of the rotor magnet exceeds 100 degrees centigrade, or 120 degrees centigrade, or 140 degrees centigrade.

7. A drive system according to claim 1 in which the control means includes a d-q frame convertor that converts a current demand signal into a q-axis current component and a d-axis current component in the d-q frame of reference, and a phase advance calculator that determines the amount of phase advance that is to be applied and generates a phase advance value that is fed to the converter, the phase advance calculator being responsive to the rotor speed and the supply voltage.

8. A drive system according to claim 7 in which the phase advance calculator is responsive to the motor rotor magnet temperature signal at least when in the abnormal mode.

9. A drive system according to claim 1 wherein in the abnormal mode, the control means is arranged to multiply the phase advance with a scaling factor having a value between 0 and 1 so that a reduced phase advance value is generated.

10. A drive system according to claim 1 wherein in the abnormal mode, the control means is arranged to apply an absolute limit to the angle of phase advance that can be applied by the drive circuit so that the phase advance is kept below the predetermined absolute limit.

11. A drive system according to claim 1 wherein the control means produces a d-axis and q-axis current component that is dependent upon a current demand signal value and which represents the current to be applied to the motor, and in the abnormal mode the control means reduces the amount of phase advance by modifying the value of the d-axis current component.

12. A drive system according to claim 11 wherein the d-axis component is modified by passing the component through a limiter that limits the magnitude of the d-axis component.

13. A drive system according to claim 11 wherein the d-axis current component is passed through a scaling function that multiplies the d-axis component by a scaling factor when in the abnormal mode.

14. A drive system according to claim 1 wherein the amount of phase advance that is applied when in the abnormal mode is chosen such that the amount of demagnetization of the magnet does not exceed 1 percent, or 2 percent, or 3 percent, or up to 5 percent when the temperature of the rotor motor magnet is below a maximum agreed operating temperature.

15. A method of driving a brushless DC motor of the kind having a rotor including at least one permanent magnet and a stator including at least one phase winding, the method comprising the steps of:
determining the position of the rotor of the motor; and
applying a drive voltage to the phase that causes a current to flow in the phase,
wherein the phase of the current passing through the winding relative to the rotor position is varied dependent upon the temperature of the rotor magnet by controlling the motor in a normal mode when the temperature of the rotor magnet is below a predetermined temperature and in an abnormal mode when the temperature of the rotor magnet is above the predetermined temperature.

16. A method according to claim 15 including the further step of operating the motor in the normal control mode when the temperature of the rotor magnet is below a first threshold level, whereby the control means is arranged to advance the phase of the current passing through the winding relative to the rotor position when the motor speed reaches or is in excessive of the maximum speed that can be achieved without phase advance, and operating the motor in the abnormal mode when the temperature of the rotor magnet is above a second threshold level, wherein in the abnormal mode an amount of phase advance is applied that is less than that which is applied when the control means is operating in the normal mode.

* * * * *